US010957927B2

(12) United States Patent
Uchimura et al.

(10) Patent No.: US 10,957,927 B2
(45) Date of Patent: Mar. 23, 2021

(54) FUEL CELL SYSTEM AND CONTROL METHOD OF THE SAME

(71) Applicant: TOYOTA JIDOSHA KABUSHIKI KAISHA, Toyota (JP)

(72) Inventors: Chihiro Uchimura, Toyota (JP); Yukihide Yokoyama, Toyota (JP); Takayoshi Hamano, Chita (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 16/867,076

(22) Filed: May 5, 2020

(65) Prior Publication Data

US 2020/0266467 A1 Aug. 20, 2020

Related U.S. Application Data

(63) Continuation of application No. 16/151,423, filed on Oct. 4, 2018, now Pat. No. 10,680,262.

(30) Foreign Application Priority Data

Nov. 20, 2017 (JP) ................................ 2017-222362

(51) Int. Cl.

| | |
|---|---|
| ***H01M 8/04302*** | (2016.01) |
| ***H01M 8/04746*** | (2016.01) |
| ***H01M 8/04089*** | (2016.01) |
| ***H01M 8/04082*** | (2016.01) |
| ***H01M 8/0438*** | (2016.01) |

(52) U.S. Cl.

CPC ... *H01M 8/04753* (2013.01); *H01M 8/04089* (2013.01); *H01M 8/04302* (2016.02); *H01M 8/04425* (2013.01); *H01M 8/04783* (2013.01); *H01M 8/04201* (2013.01)

(58) Field of Classification Search

None

See application file for complete search history.

(56) References Cited

FOREIGN PATENT DOCUMENTS

JP 2009-018803 1/2009

OTHER PUBLICATIONS

U.S. Appl. No. 16/151,423, filed Oct. 4, 2018.

*Primary Examiner* — Yoshitoshi Takeuchi

(74) *Attorney, Agent, or Firm* — Finnegan, Henderson, Farabow, Garrett & Dunner, LLP

(57) ABSTRACT

A fuel cell system includes a supply channel having first channels respectively connected with tanks, and a second channel merged with each of the first channels; first on-off valves of the first channels; a second on-off valve of the second channel; and a controller configured to control opening and closing of the first on-off valves and the second on-off valve. In a state where the second on-off valve is closed, the controller supplies first electric power used for opening the first on-off valve against a first differential pressure to at least one first on-off valve, and supplies second electric power, smaller than the first electric power and used for opening the first on-off valves against a second differential pressure smaller than the first differential pressure, to the first on-off valves other than the at least one first on-off valve.

1 Claim, 4 Drawing Sheets

FUEL CELL SYSTEM AND CONTROL METHOD OF THE SAME

INCORPORATION BY REFERENCE

This application is a continuation of U.S. patent application Ser. No. 16/151,423, filed on Oct. 4, 2018, which claims the benefit of Japanese Patent Application No. 2017-222362 filed on Nov. 20, 2017, which are both incorporated herein by reference in theft entirety.

BACKGROUND

1. Technical Field

The present disclosure relates to a fuel cell system and a control method of the fuel cell system.

2. Description of Related Art

There is a fuel cell system including a fuel cell, a plurality of tanks that store a fuel gas used for power generation in the fuel cell, and an on-off valve provided in each of the tanks for switching opening and closing of the tank (see Japanese Patent Application Publication No. 2009-018803).

SUMMARY

As an on-off valve of the tank in the fuel cell system as in JP 2009-018803 A, an on-off valve of the type that presses a valve body to a valve seat with gas pressure on a tank side is used to secure sealing performance. To open such an on-off valve against a differential pressure, relatively large electric power is needed. Accordingly, the fuel cell system as in JP 2009-018803 A has a problem that a lot of electric power is used for opening on-off valves when all the on-off valves are opened at the time of power generation in the fuel cell. In order to solve such a problem, a technique that allows reduction of the electric power needed for opening on-off valves when all the on-off valves are opened at the time of power generation in a fuel cell is desired in the fuel cell system including a plurality of tanks.

The present disclosure can be implemented as following aspects.

A first aspect of the present disclosure relates to a fuel cell system. The fuel cell system includes: a fuel cell; a plurality of tanks that store a fuel gas used for power generation in the fuel cell; a supply channel having first channels respectively connected with the tanks and a second channel merged with each of the first channels and connected to the fuel cell; first on-off valves provided in each of the first channels, the first on-off valves being configured to switch opening and closing of the first channels, the first on-off valves each including a valve body, the first on-off valves being configured to seal the first channels with a differential pressure between a first side and a second side of the valve body; a second on-off valve provided in the second channel, the second on-off valve being configured to switch opening and closing of the second channel; and a controller configured to control electric power supplied to the first on-off valves and the second on-off valve so as to control opening and closing of the first on-off valves and opening and closing of the second on-off valve. In a state where the second on-off valve is closed, the controller supplies, in response to a start-up command for starting up the fuel cell system, first electric power to at least one first on-off valve out of the first on-off valves, the first electric power being used for opening the first on-off valve against a first differential pressure, and supplies second electric power that is smaller than the first electric power to the first on-off valves other than the at least one first on-off valve, the second electric power being used for opening the first on-off valves against a second differential pressure that is smaller than the first differential pressure. According to such an aspect, the first on-off valve that receives supply of the first electric power is opened, and a fuel gas flows into the supply channel. Consequently, a differential pressure between the inside-tank pressure in the tanks equipped with the first on-off valves that receive supply of the second electric power and the pressure in the supply channel decreases. As a result, the first on-off valves can be opened even with supply of the second electric power that is smaller than the first electric power. Therefore, as compared with the aspect in which the first electric power is supplied to all the first on-off valves, the electric power required to open all the first on-off valves can be reduced.

In the first aspect, the fuel cell system may further include: a filling channel branching from a receptacle that is a filling port of a hydrogen gas and connecting with each of the tanks; a first pressure sensor configured to acquire a pressure value in the filling channel; and a second pressure sensor configured to acquire a pressure value in the supply channel. While the fuel cell system stops, the controller may acquire the pressure value in the filling channel, and the pressure value in the supply channel, and when it is in a high differential pressure state where a differential pressure value between the pressure value in the filling channel and the pressure value in the supply channel is as high as a set value or more, the controller may execute a valve opening process, the valve opening process being configured to supply the first electric power to the at least one first on-off valve, and supply the second electric power to the first on-off valves other than the at least one first on-off valve.

In the first aspect, the fuel cell system may further include: first pressure sensors configured to acquire inside-tank pressure values in each of the tanks; and a second pressure sensor configured to acquire a pressure value in the supply channel. While the fuel cell system stops, the controller may acquire the inside-tank pressure values in the tanks, and the pressure value in the supply channel, and when it is in a high differential pressure state where a differential pressure value between the inside-tank pressure value in at least one tank out of the tanks and the pressure value in the supply channel is as high as a set value or more, the controller may execute a valve opening process, the valve opening process being configured to supply the first electric power to the at least one first on-off valve, and supply the second electric power to the first on-off valves other than the at least one first on-off valve. According to such an aspect, while the fuel cell system stops, the pressure in the supply channel can be increased in advance. This makes it possible to shorten a period of time until the first on-off valves that receive supply of the second electric power open after the fuel cell system is started up.

In the first aspect, while the fuel cell system stops, the controller may be configured to periodically execute the valve opening process.

In the first aspect, the controller may be configured to supply the second electric power to the first on-off valves other than the at least one first on-off valve, and once all the first on-off valves are opened, the controller may be configured to supply the second electric power to the at least one first on-off valve that received supply of the first electric power.

In the first aspect, the first on-off valves that receive supply of the second electric power may be smaller in upper limit differential pressure than the first on-off valve that receives supply of the first electric power, the upper limit differential pressure being an upper limit of the differential pressure between the first side and the second side of the on-off valves, the differential pressure being in a range that enables the on-off valves to open. According to such an aspect, the cost of the fuel cell system can be reduced, since the on-off valves with a small upper limit differential pressure are generally more inexpensive than the on-off valves with a large upper limit differential pressure.

A second aspect of the present disclosure relates to a control method of a fuel cell system. The fuel cell system includes: a fuel cell; a plurality of tanks that store a fuel gas used for power generation in the fuel cell; a supply channel having first channels respectively connected with the tanks, and a second channel merged with each of the first channels and connected to the fuel cell; first on-off valves provided in each of the first channels, the first on-off valves being configured to switch opening and closing of the first channels, the first on-off valves each including a valve body, the first on-off valves being configured to seal the first channels with a differential pressure between a first side and a second side of the valve body; and a second on-off valve provided in the second channel, the second on-off valve being configured to switch opening and closing of the second channel. The control method of the fuel cell system includes: in a state where the second on-off valve is closed, supplying, in response to a start-up command for starting up the fuel cell system, first electric power to at least one first on-off valve out of the first on-off valves, the first electric power being used for opening the first on-off valve against a first differential pressure; and supplying, in the state, second electric power that is smaller than the first electric power to the first on-off valves other than the at least one first on-off valve, the second electric power being used for opening the first on-off valves against a second differential pressure that is smaller than the first differential pressure.

The present disclosure can also be implemented in various aspects other than the fuel cell system. For example, the present disclosure can also be implemented in the aspects, such as a supplying method of a fuel gas to a fuel cell in a fuel cell system mounted on a vehicle, a controller that executes the supplying method, a computer program that implements the supplying method, a recording medium that stores the computer program, and a mobile object incorporating a fuel cell system.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

A. First Embodiment

Figure 1:
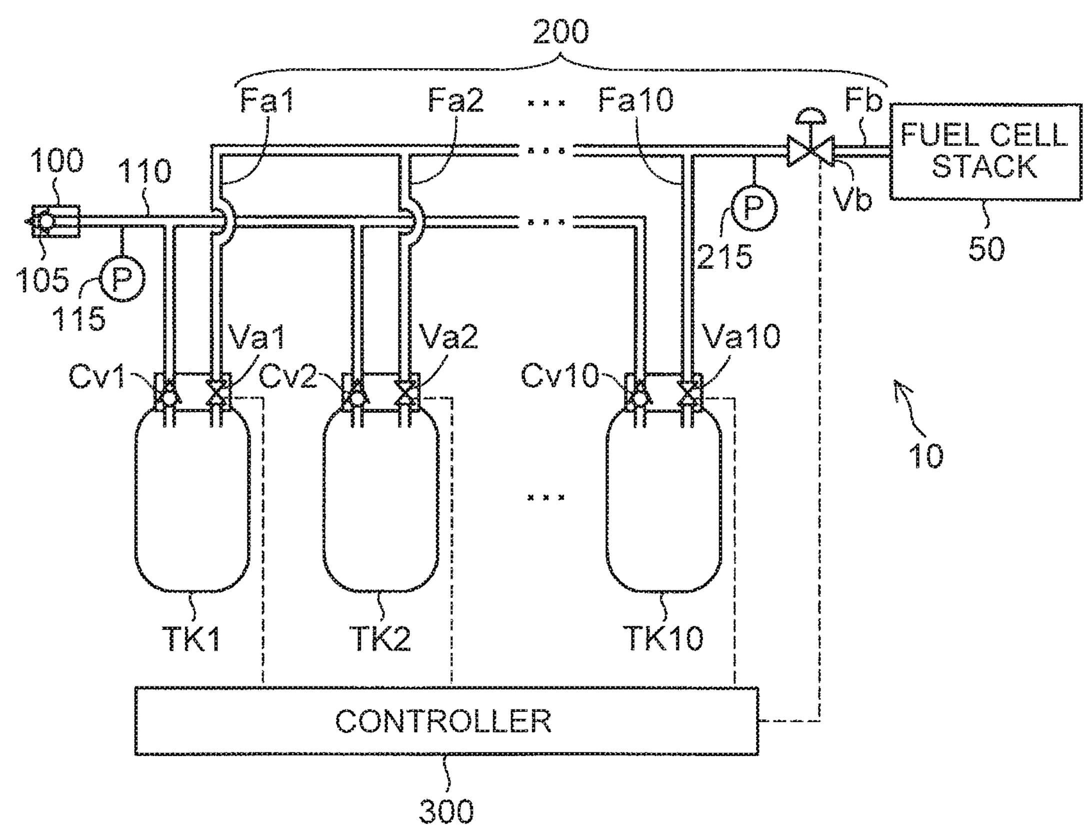
FIG. 1 is an explanatory view illustrating the configuration of a fuel cell system according to a first embodiment.

A1. Device Configuration:

FIG. 1 is an explanatory view illustrating the configuration of a fuel cell system 10 according to a first embodiment of the present disclosure. The fuel cell system 10 is mounted on a vehicle driven with a motor, as a power source of the vehicle. Examples of the vehicle include passenger cars, buses and the like. The fuel cell system 10 includes a fuel cell stack 50, a receptacle 100, a filling channel 110, tanks TK1 to TK10, a supply channel 200, and a controller 300. The fuel cell system 10 includes a total often tanks from a tank TK1 to a tank TK10. In FIG. 1, the tanks TK1, TK2, TK10 are illustrated, while the tanks TK3 to TK9 are omitted. In subsequent description, the ten tanks may collectively be designated by a reference sign "TK."

The fuel cell stack 50 has a stack structure formed by stacking a plurality of single cells. The single cells are each composed of a membrane electrode assembly that is interposed between separators, the membrane electrode assembly being formed by bonding an anode and a cathode on both the surfaces of an electrolyte membrane having proton conductivity. The fuel cell stack 50 generates electric power by an electrochemical reaction between hydrogen and oxygen upon reception of supply of hydrogen gas and air.

The receptacle 100 is a filling port of hydrogen gas that is a fuel gas. At the time of filling of the fuel gas, a nozzle of a hydrogen station is attached to the receptacle 100. The receptacle 100 has a check valve 105. The check valve 105 prevents backflow of the filled fuel gas.

The filling channel 110 is used to carry the filled fuel gas from the receptacle 100 to the tanks TK1 to TK0. The filling channel 110 branches from the receptacle 100 to the tanks TK and is connected with the tanks TK. In the filling channel 110, a channel portion branching to the tank TK1 is equipped with a check valve Cv1. The check valve Cv1 prevents the fuel gas filled in the tank TK1 from flowing backward to the receptacle 100 side. Check valves Cv2 to Cv10 have the same configuration as the check valve Cv1. The check valves Cv2 to Cv10 are provided in channel portions of the filling channel 110 that branch to the tanks TK2 to TK0, respectively.

The filling channel 110 is equipped with a pressure sensor 115. The pressure sensor 115 measures a pressure P0 in the filling channel 110. Since the filling channel 110 and the tanks TK are connected, it can be assumed that the pressure P0 measured by the pressure sensor 115 is equal to the pressures in the tanks TK1 to TK10.

The tank TK1 stores hydrogen gas as a fuel gas used for power generation in the fuel cell stack 50. The tanks TK2 to TK10 have the same configuration as the tank TK1.

The supply channel 200 connects the tanks TK to the fuel cell stack 50, and carries the fuel gas supplied from the tanks TK to the fuel cell stack 50. The supply channel 200 has first channels Fa1 to Fa10 respectively connected to the tanks TK1 to TK10, and a second channel Fb merged with the first channels Fa1 to Fa10 and connected to the fuel cell stack 50.

The first channel Fa1 is equipped with a first on-off valve Va1 that switches opening and closing of the first channel Fa1. The first on-off valve Va1 is a solenoid valve that seals the first channel Fa1 with a differential pressure between before and after a valve body of the first on-off valve Va1.

The first on-off valve Va1 is also a solenoid valve that can be opened against the differential pressure with use of the force corresponding to the supplied electric power. In the present embodiment, the first on-off valve Va1 is a pilot valve. In other embodiments, the first on-off valve Va1 may be a valve of any form as long as it is a solenoid valve that seals the first channel Fa1 with the differential pressure between before and after the valve body and is also a solenoid valve that can be opened against the differential pressure with use of the force corresponding to the supplied electric power. Like the first on-off valve Va1 of the first channel Fa1, the first channels Fa2 to Fa10 are equipped with corresponding first on-off valves Va2 to Va10. The first on-off valves Va2 to Va10 are solenoid valves having the same configuration as the first on-off valve Va1. In subsequent description, the ten first on-off valves may collectively be designated by a reference sign "Va."

The second channel Fb is equipped with a second on-off valve Vb that switches opening and closing of the second channel Fb. The second channel Fb is equipped with a pressure sensor 215. The pressure sensor 215 measures a pressure P1 in the supply channel 200.

The controller 300 receives signals output from unillustrated various sensors included in the fuel cell system 10 and controls operation of each unit of the fuel cell system 10. The controller 300 controls the electric power supplied to the first on-off valves Va and the second on-off valve Vb so as to control opening and closing of the first on-off valves Va and opening and closing of the second on-off valve Vb. In the present embodiment, the electric power required for opening the first on-off valves Va and the second on-off valve Vb is supplied from an unillustrated battery. The controller 300 may be composed of an electronic control unit (ECU).

In the fuel cell system 10, when power generation by the fuel cell stack 50 is carried out, the first on-off valves Va are all opened. At that time, the pressure in each of the tanks TK is identical. However, the positions at which the tanks TK are mounted on the vehicle are each different in the vehicle. Accordingly, in the state where the fuel cell system 10 is in operation, the tanks TK are different in temperature environment from each other due to a difference in the amount of radiant heat transmitted from devices disposed around each of the tanks TK. Therefore, when the difference in temperature between the tanks TK disappears after the stop of the fuel cell system 10, the pressures in the tanks TK may become different from each other.

Under such circumstances, when only the first on-off valve Va in some of the tanks TK, out of the tanks TK, is opened, and the opened tank TK stores a high-pressure gas higher in pressure than the gas in other closed tanks TK, the high-pressure fuel gas released from the opened tank TK may damage the first on-off valves Va of the closed tanks TK. In order to prevent such damage, the fuel cell system 10 executes, at the start of power generation in the fuel cell stack 50, a later-described valve opening process at time of start-up to open all the first on-off valves Va.

Figure 2:
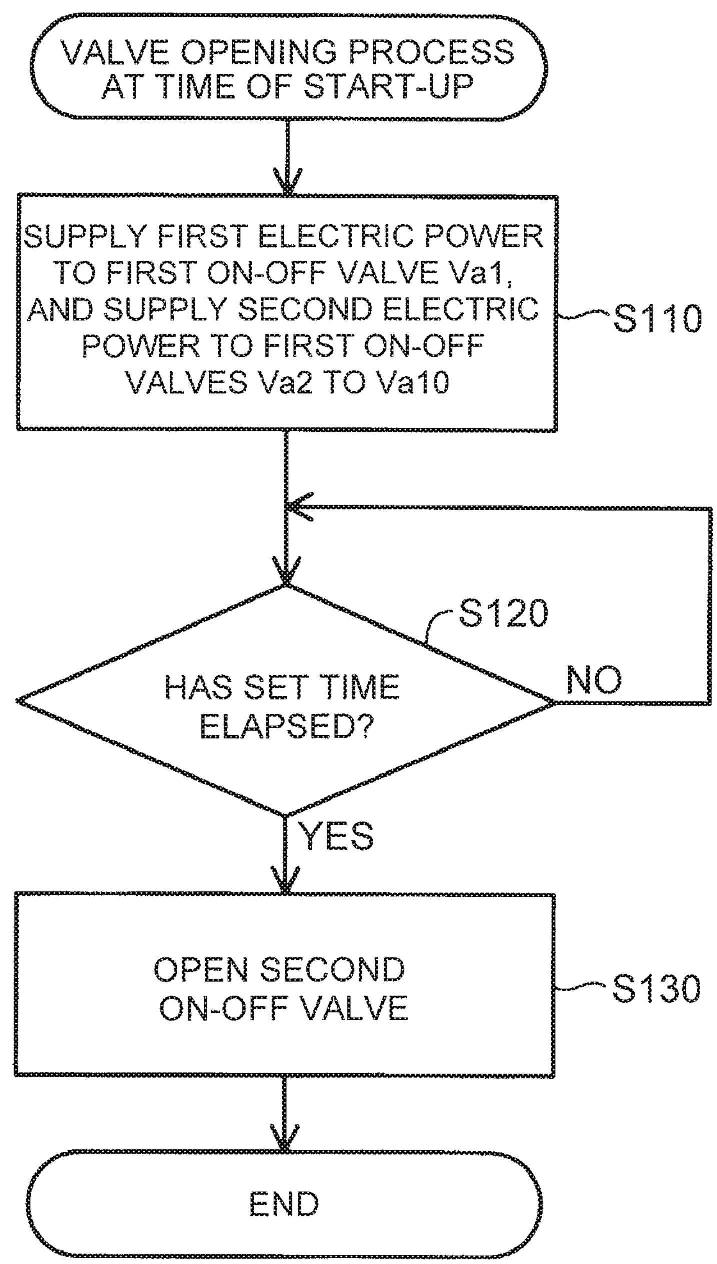
FIG. 2 is a flow illustrating a valve opening process at time of start-up executed by a controller.

A2. Valve Opening Process at Time of Start-Up:

FIG. 2 is a flow illustrating the valve opening process at time of start-up executed by the controller 300. In the state where the fuel cell system 10 stops, the controller 300 executes the valve opening process at time of start-up upon reception of a start-up command for starting up the fuel cell system 10. The controller 300 receives a notification of an ignition switch included in the vehicle mounted with the fuel cell system 10 being turned on as a start-up command. The valve opening process at time of start-up is a process performed for opening the first on-off valves Va1 to Va10 on the occasion of power generation by the fuel cell stack 50.

A description is given of the state where the fuel cell system 10 stops before the valve opening process at time of start-up is executed. In the state where the fuel cell system 10 stops, the first on-off valves Va and the second on-off valve Vb are closed. In the state where the fuel cell system 10 stops, the pressure in the supply channel 200 is relatively lower than the pressures in each of the tanks TK mounted at respective positions in the vehicle. This is because when the fuel cell system 10 stops, electric power is required in the process of stopping the devices constituting the fuel cell system 10, and therefore the fuel cell stack 50 consumes the fuel gas in the supply channel 200 in order to generate the required electric power.

As illustrated in FIG. 2, when the valve opening process at time of start-up is started, the controller 300 supplies first electric power used for opening the first on-off valve to the first on-off valve Va1, while supplying second electric power that is smaller than the first electric power to other first on-off valves Va (Va2 to Va10) (step S110).

The first electric power is the electric power used for opening the first on-off valve Va against a first differential pressure. In the present embodiment, the first differential pressure is an upper limit differential pressure. The upper limit differential pressure used herein refers to an upper limit of the differential pressure between one side and the other side of the on-off valves, the differential pressure being in a range that enables the on-off valves to open. In the present embodiment, the upper limit differential pressure of the first on-off valve Va1 is 90 Mpa. Therefore, the first electric power is the electric power that enables the first on-off valves Va to open against a differential pressure of 90 MPa. In other embodiments, the first differential pressure may be lower than the upper limit differential pressure.

The second electric power is the electric power that is smaller than the first electric power and is used for opening the first on-off valves Va against a second differential pressure that is smaller than the first differential pressure. In the present embodiment, the second differential pressure is 20 MPa. Therefore, the second electric power is the electric power that enables the first on-off valves Va to open against a differential pressure of 20 MPa. In other embodiments, the second differential pressure may be any differential pressure that is lower than the first differential pressure.

When the first on-off valve Va1 that receives supply of the first electric power is opened, the fuel gas is supplied from the tank TK1 into the supply channel 200. The pressure in the supply channel 200 approaches the inside-tank pressures in the tanks TK2 to TK10 when the fuel gas is supplied. The first on-off valves Va2 to Va10 are opened when a differential pressure between the pressure on the side of the supply channel 200 and the pressure on the side of the tanks TK2 to TK10 becomes the second differential pressure that is a differential pressure in the range that enables the first on-off valves Va2 to Va10 that receive supply of the second electric power to open. After the first on-off valves Va2 to Va10 are opened, the second electric power is supplied to the first on-off valve Va1 that received the first electric power, in order to maintain the first on-off valve Va1 in an opened state.

After the first electric power and the second electric power are supplied to the first on-off valves Va (step S110), the controller 300 determines whether or not a preset time has elapsed (step S120). The preset time used herein is a sufficient time set as the time taken for opening all the first on-off valves Va after the first electric power and the second electric power are supplied to the first on-off valves Va.

After determining that the preset time has elapsed (step S120: YES), the controller 300 opens the second on-off valve Vb (step S130). Then, the controller 300 ends the valve opening process at time of start-up. When the second on-off valve Vb is opened, the fuel cell stack 50 starts power generation.

According to the first embodiment described in the foregoing, the first on-off valve Va1 that receives supply of the first electric power is opened, and the fuel gas flows into the supply channel 200. This decreases a differential pressure between the inside-tank pressure in the tanks TK2 to TK10 equipped with the first on-off valves Va2 to Va10 that receive supply of the second electric power and the pressure in the supply channel 200. Accordingly, the first on-off valves Va2 to Va10 can be opened with supply of the second electric power. Therefore, as compared with the aspect in which the first electric power is supplied to all the first on-off valves Va, the amount of electric power consumption required to open all the first on-off valves Va can be reduced.

B. Second Embodiment

A fuel cell system of a second embodiment will be described. The configuration of the fuel cell system of the second embodiment is the same as the configuration of the fuel cell system 10 of the first embodiment. The fuel cell system of the second embodiment is different in the details of the process executed by the controller 300.

Figure 3:
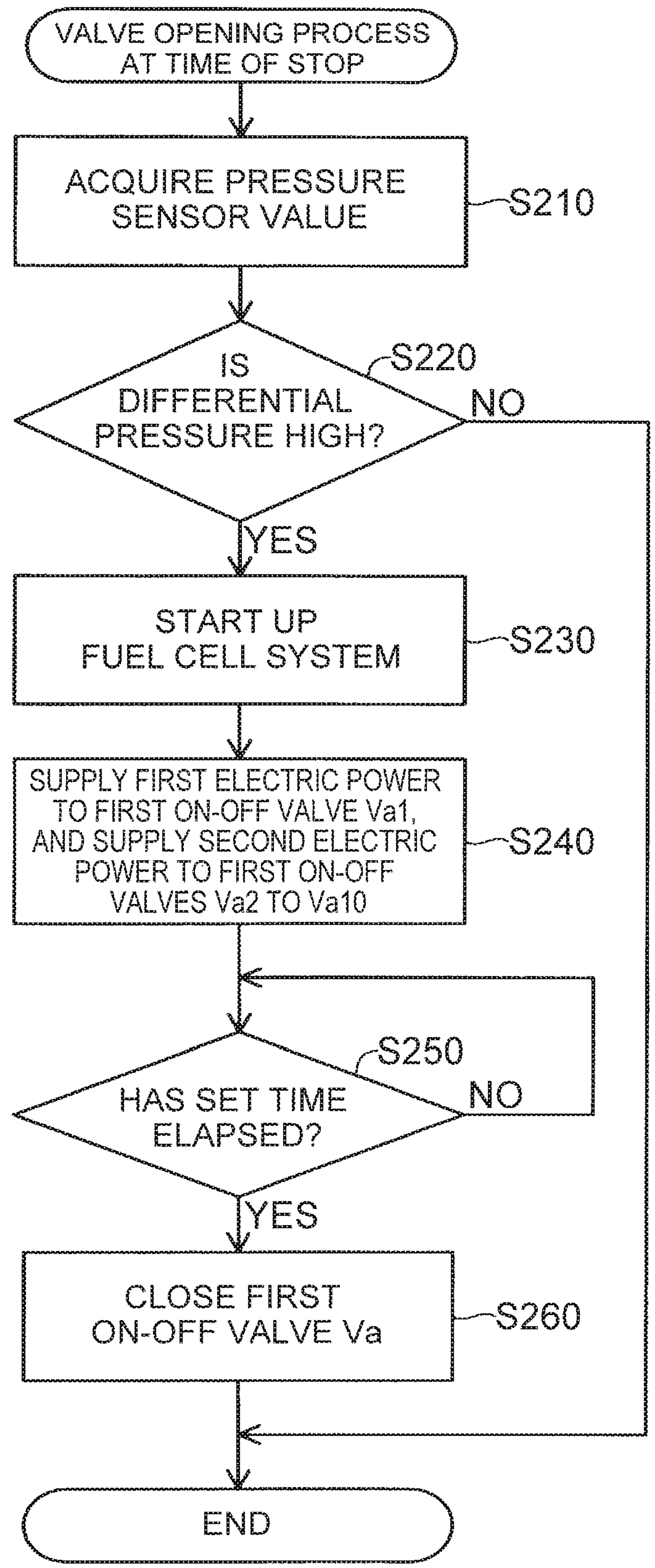
FIG. 3 is a flow illustrating a valve opening process at time of stop executed by the controller.

FIG. 3 is a flow illustrating a valve opening process at time of stop that is executed by the controller of the second embodiment. The controller 300 in the fuel cell system of the second embodiment executes the valve opening process at time of stop in addition to the valve opening process at time of start-up described in the first embodiment. The controller 300 of the second embodiment periodically executes the valve opening process at time of stop, while the fuel cell system stops. The valve opening process at time of stop is a process for increasing the pressure in the supply channel 200 in advance, while the fuel cell system stops.

As illustrated in FIG. 3, when the valve opening process at time of stop is started, the controller 300 of the second embodiment accrues a pressure P0 in the filling channel 110 measured by the pressure sensor 115 and a pressure P1 in the supply channel 200 measured by the pressure sensor 215 (step S210).

After acquiring the pressure P0 and the pressure P1 (step S210), the controller 300 of the second embodiment determines whether or not it is in a high differential pressure state where a differential pressure between the pressure P0 and the pressure P1 is as high as a set value or more (step S220).

When determining that it is not in the high differential pressure state (step S220: NO), the controller 300 of the second embodiment ends the valve opening process at time of stop.

When determining that it is in the high differential pressure state (step S220: YES), the controller 300 of the second embodiment starts up the fuel cell system (step S230).

After starting up the fuel cell system (step S230), the controller 300 of the second embodiment supplies the first electric power to the first on-off valve Va1, while supplying the second electric power to other first on-off valves Va (Va2 to Va10) (step S240). At the time, as in step S110 in the valve opening process at time of start-up illustrated in FIG. 2, the first on-off valve Va1 that receives supply of the first electric power is opened, and the fuel gas is supplied into the supply channel 200. Accordingly, the pressure in the supply channel 200 approaches the inside-tank pressures in the tanks TK2 to TK10. As a result, the first on-off valves Va2 to Va10 are opened when a differential pressure between the side of the supply channel 200 and the side of the tanks TK2 to TK10 becomes the second differential pressure that is a differential pressure in the range that enables the first on-off valves Va2 to Va10 that received supply of the second electric power to open.

After the first electric power and the second electric power are supplied to the first on-off valves Va (step S240), the controller 300 of the second embodiment determines whether or not a preset time has elapsed (step S250). The preset time used herein is a sufficient time set as the time taken until the pressure in the tanks TK with the first on-off valves Va being opened becomes substantially equal to the pressure in the supply channel 200.

After determining that the preset time has elapsed (step S250: YES), the controller 300 of the second embodiment closes the opened first on-off valves Va (step S260). In the second embodiment, the first on-off valves Va1 to Va10 are closed in step S260. Then, the controller 300 of the second embodiment ends the valve opening process at time of stop.

Figure 4:
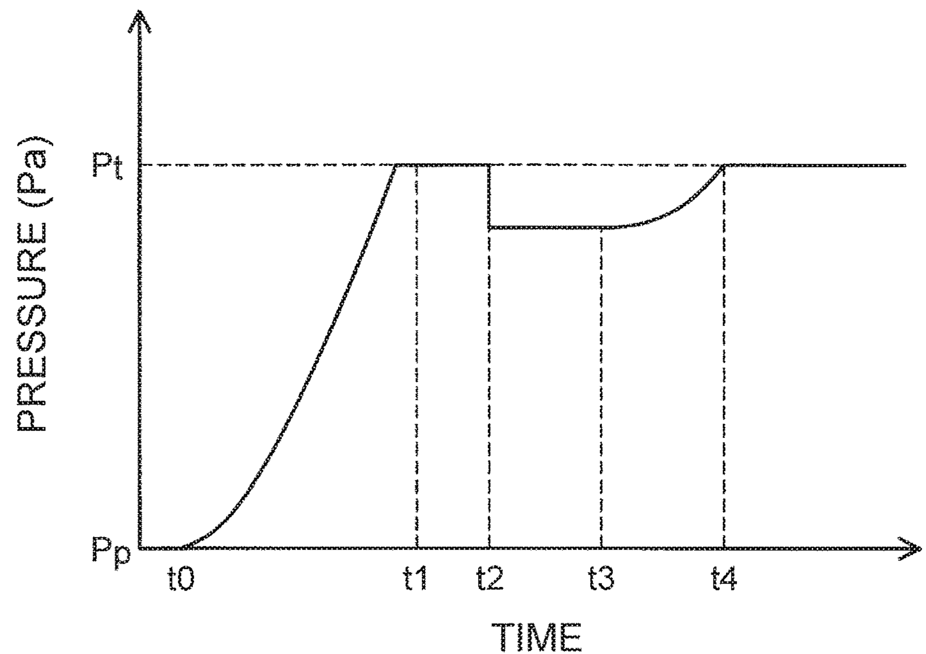
FIG. 4 is an explanatory view illustrating pressure fluctuation in a supply channel in the valve opening process at time of stop.

FIG. 4 is an explanatory view illustrating pressure fluctuation in the supply channel 200 in the valve opening process at time of stop in the second embodiment. In FIG. 4, a horizontal axis represents time, and a vertical axis represents pressure.

At timing t0, step S240 of the valve opening process at time of stop described in FIG. 3 is executed, and the first on-off valves Va1 to Va10 are opened. A pressure Pp in the supply channel 200 at timing t0 represents the pressure caused by the fuel gas remaining in the supply channel 200 after the last stop of the fuel cell system. During a period from timing t0 to timing t1, the fuel gas is released from the tanks TK1 to TK0 with the first on-off valves Va1 to Va10 being opened. This increases the pressure in the supply channel 200.

At timing t1, the pressure in the supply channel 200 is a pressure Pt that is substantially equal to the pressure in the tanks TK1 to TK10. The phrase "preset time" in step S250 of the valve opening process at time of stop described in FIG. 3 refers to a period of time from timing t0 to timing t1. At timing t1, the first on-off valves Va1 to Va10 are closed.

At timing t2, the process at the time of stopping the fuel cell system is executed. Here, the fuel cell stack 50 consumes the fuel gas in the supply channel 200 to generate electric power that is required in the process of stopping each of the devices constituting the fuel cell system. Therefore, at timing t2, the pressure in the supply channel 200 decreases from the pressure Pt.

At timing t3, the valve opening process at time of start-up described in FIG. 2 is started and step S110 is executed. As a result, the first on-off valve Va1 that receives supply of the first electric power is opened. During a period from timing t3 to timing t4, the fuel gas is released from the tank TK1 with the first on-off valve Va1 being opened. This increases the pressure in the supply channel 200.

At timing t4, the pressure in the supply channel 200 becomes the pressure Pt. As the pressure in the supply channel 200 increases during the period from timing t3 to timing t4, a differential pressure between the pressure on the side of the supply channel 200 and the pressure in the tanks TK2 to TK10 which is equal to the pressure Pt at timing t1 decreases. When the differential pressure becomes the second differential pressure that is a differential pressure in a range that enables the first on-off valves Va2 to Va10 that receives supply of the second electric power to open, the first on-off valves Va2 to Va10 are opened.

According to the second embodiment described in the foregoing, while the fuel cell system stops, the pressure in the supply channel 200 can be increased in advance. This makes it possible to shorten a period of time until the first on-off valves Va that receive supply of the second electric power open after the fuel cell system is started up. Here, the time until the first on-off valves that receive supply of the second electric power open refers to the period from timing t3 to timing t4 in FIG. 4.

The effects of the valve opening process at time of stop described in the second embodiment are exhibited when the fuel cell system is started up for the first time after the tanks TK are filled with the fuel gas in particular. When the fuel cell system is started up for the first time after the tanks TK are filled with the fuel gas, it is highly probable that there is a large difference between the pressure in the tanks TK and the pressure in the supply channel 200. Accordingly, in the fuel cell system that does not execute the valve opening process at time of stop, the time taken for the pressure in the supply channel 200 to approach the inside-tank pressure in the tanks TK2 to TK10 by opening the first on-off valve Va1 and supplying the fuel gas from the tank TK1 tends to be longer in the valve opening process at time of start-up. In contrast, in the fuel cell system that executes the valve opening process at time of stop described in the second embodiment, the time taken for the pressure in the supply channel 200 to approach the inside-tank pressure in the tanks TK2 to TK10 can be shortened by executing the valve opening process at time of stop in advance before the fuel cell system is started up for the first time after the tanks TK are filled with the fuel gas.

C. Third Embodiment

Figure 5:
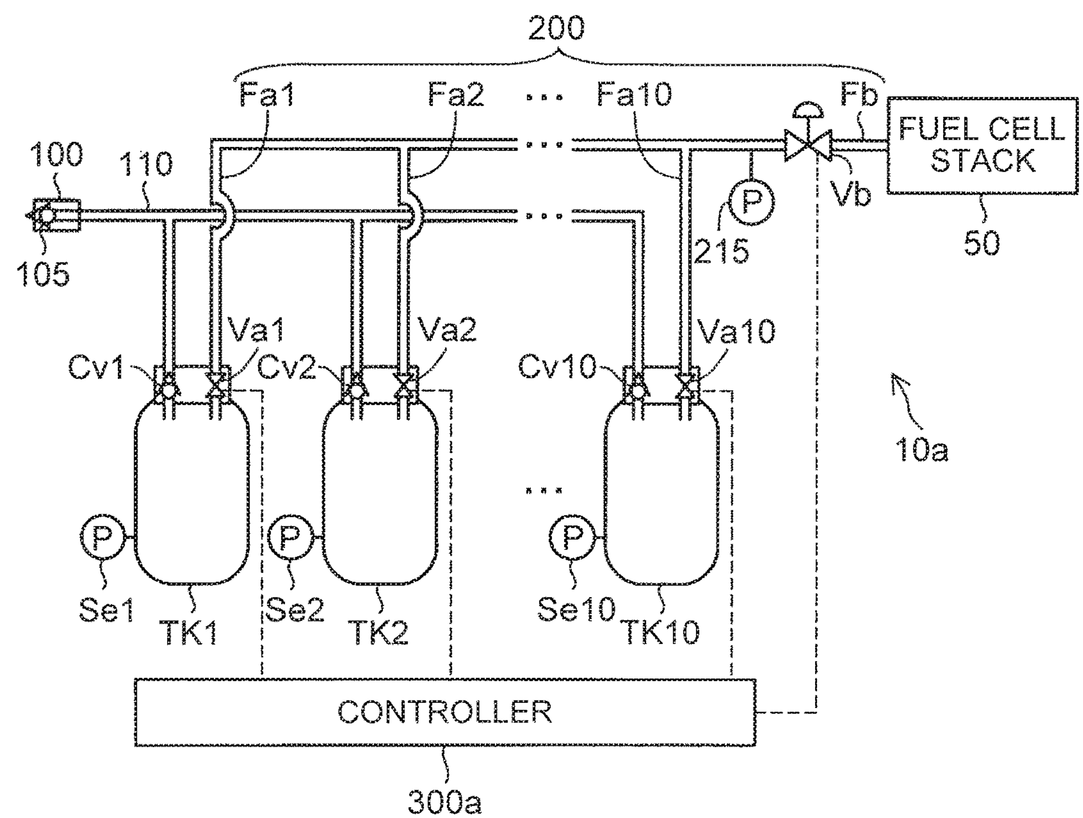
FIG. 5 is an explanatory view illustrating the configuration of a fuel cell system according to a third embodiment.

FIG. 5 is an explanatory view illustrating the configuration of a fuel cell system 10*a* according to a third embodiment. The fuel cell system 10*a* is similar in configuration to the fuel cell system in the second embodiment except that the fuel cell system 10*a* includes pressure sensors Se1 to Se10 in place of the pressure sensor 115 and includes a controller 300*a* that is different in the details of the process to execute from the controller 300 in the second embodiment The pressure sensor Se1 is provided in the tank TK1. The pressure sensor Se1 measures a pressure PT1 in the tank TK1. The pressure sensors Se2 to Se10 are provided in the corresponding tanks TK2 to TK10 as in the case of the pressure sensor Se1. The pressure sensors Se2 to Se10 measure pressures PT2 to PT10 in the tanks TK2 to TK10.

The controller 300*a* executes a valve opening process at time of stop that is different from the valve opening process at time of stop described in the second embodiment.

A description is given of the valve opening process at time of stop executed by the controller 300*a*. The controller 300*a* executes the valve opening process at time of stop having the same procedures as the process illustrated in FIG. 3 described in the second embodiment except the following points. That is, the pressures PT1 to PT10 in the tanks TK1 to TK10 measured by the pressure sensors Se1 to Se10 and the pressure P1 in the supply channel 200 measured by the pressure sensor 215 are acquired in step S210, and the state of a high differential pressure is determined based on the pressures PT1 to PT10 and the pressure P1 in step S220.

The controller 300*a* determines in step S220 whether or not it is in a high differential pressure state where a differential pressure between each of the pressures PT1 to PT10 and the pressure P1 is as high as a set value or more. In other words, the controller 300*a* determines whether or not any one of the pressures PT1 to PT10 has a high differential pressure from the pressure P1. When any one of the pressures PT1 to PT10 has a high differential pressure from the pressure P1, the process subsequent to step S230 is performed. As for the process from step S230 to step S250, the controller 300*a* performs the same process as the valve opening process at time of stop described in the second embodiment.

D. Fourth Embodiment

A fuel cell system of a fourth embodiment will be described. The fuel cell system of the fourth embodiment is similar in configuration to the fuel cell system 10 of the first embodiment except that the first on-off valve Va1 and the first on-off valves Va2 to Va10 are solenoid valves different in structure.

In the fuel cell system of the fourth embodiment, the first on-off valve Va1 is different in upper limit differential pressure from the first on-off valves Va2 to Va10. In the fourth embodiment, the first on-off valves Va2 to Va10 are on-off valves with an upper limit differential pressure smaller than that of the first on-off valve Va1. The upper limit differential pressure of the first on-off valve Va1 is 90 Mpa, whereas the upper limit differential pressure of the first on-off valves Va2 to Va10 is 20 Mpa.

According to the fourth embodiment described in the foregoing, the cost of the fuel cell system can be reduced, since the on-off valves with a small upper limit differential pressure are generally more inexpensive than the on-off valves with a large upper limit differential pressure.

E. Other Embodiments

In the first embodiment, etc. described before, the fuel cell system is mounted on a vehicle. However, the present disclosure is not limited thereto. For example, the fuel cell system may be mounted on mobile objects, such as boats and airplanes using electric power as a power source, and also be mounted on various devices, facilities, and the like, such as industrial machines, and power facilities, without being limited to the mobile objects.

In the first embodiment described before, the fuel cell system 10 includes a total of ten tanks from tanks TK1 to TK10. However, the present disclosure is not limited thereto. For example, the fuel cell system 10 can demonstrate the effects of the present disclosure, as long as the fuel cell system 10 includes any number of tanks TK that is equal to or greater than two.

Although the first on-off valve Va that receives supply of the first electric power is the first on-off valve Va1 in the first embodiment, etc. described before, the present disclosure is not limited thereto. For example, the first on-off valve Va that receives supply of the first electric power may be any first on-off valve Va other than the first on-off valve Va1. Unless the first electric power is supplied to all the first on-off valves Va included in the fuel cell system, any number of the first on-off valves Va out of the first on-off valves Va may receive the first electric power.

Although the controller 300 receives a notification of the ignition switch included in the vehicle mounted with the fuel cell system 10 being turned on as a start-up command in the first embodiment described before, the present disclosure is not limited thereto. For example, the controller 300 may receive a notification of the elapse of a fixed period of time as a start-up command, or may receive a notification of a driver sitting on the driver seat as a start-up command.

Without being limited to the aforementioned embodiments, the present disclosure can be implemented in various configurations without departing from the meaning thereof. For example, technical features in the embodiments corresponding to the technical features in each aspect disclosed in SUMMARY can properly be replaced or combined in order to solve some or all of the aforementioned problems, or in order to accomplish some or all of the aforementioned effects. The technical features may properly be deleted unless otherwise specified as essential elements in this specification.

What is claimed is:

1. A control method of a fuel cell system, the fuel cell system including: a fuel cell; a plurality of tanks that store a fuel gas used for power generation in the fuel cell; a supply channel having first channels respectively connected with the tanks and a second channel merged with each of the first channels and connected to the fuel cell; first on-off valves provided in each of the first channels, the first on-off valves being configured to switch opening and closing of the first channels, the first on-off valves each including a valve body, the first on-off valves being configured to seal the first channels with a differential pressure between a first side and a second side of the valve body; and a second on-off valve provided in the second channel, the second on-off valve being configured to switch opening and closing of the second channel, the control method comprising:

in a state where the second on-off valve is closed, supplying, in response to a start-up command for starting up the fuel cell system, first electric power to at least one first on-off valve out of the first on-off valves, the first electric power being used for opening the first on-off valve against a first differential pressure; and supplying, in the state, second electric power that is smaller than the first electric power to the first on-off valves other than the at least one first on-off valve, the second electric power being used for opening the first on-off valves against a second differential pressure that is smaller than the first differential pressure.

* * * * *